US006553092B1

(12) United States Patent
Mattson et al.

(10) Patent No.: US 6,553,092 B1
(45) Date of Patent: Apr. 22, 2003

(54) MULTI-LAYER X-RAY DETECTOR FOR DIAGNOSTIC IMAGING

(75) Inventors: Rodney A. Mattson, Mentor, OH (US); Olga Shapiro, Haifa (IL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 09/519,704

(22) Filed: Mar. 7, 2000

(51) Int. Cl.⁷ .................................................. A61B 6/00
(52) U.S. Cl. ..................................... 378/19; 250/370.11
(58) Field of Search ........................... 378/19; 250/368, 250/483.1, 367, 370.09, 370.11

(56) References Cited

U.S. PATENT DOCUMENTS

| | | | |
|---|---|---|---|
| 3,936,645 A | | 2/1976 | Iversen ........................ 250/486 |
| 4,055,765 A | | 10/1977 | Gerber et al. ................ 250/370 |
| 4,153,412 A | * | 5/1979 | Bailey .......................... 8/2.5 A |
| 4,179,100 A | | 12/1979 | Sashin et al. ................ 250/416 |
| 4,220,860 A | * | 9/1980 | Carlson et al. .......... 250/361 R |
| 4,234,792 A | * | 11/1980 | DeCou et al. .......... 250/370.09 |
| 4,525,628 A | | 6/1985 | DiBianca et al. ............ 250/367 |
| 4,533,489 A | * | 8/1985 | Utts et al. .................. 252/301.17 |
| 4,598,203 A | * | 7/1986 | Umetani et al. ............. 250/366 |
| 4,694,177 A | | 9/1987 | Akai ............................ 250/368 |
| 4,870,667 A | * | 9/1989 | Brunnett et al. ............... 378/19 |
| 4,879,464 A | | 11/1989 | Iinuma .................... 250/361 R |
| 4,937,453 A | | 6/1990 | Nelson ................... 250/370.89 |
| 4,965,726 A | | 10/1990 | Heuscher et al. ....... 364/413.19 |
| 4,980,553 A | | 12/1990 | Henry ......................... 250/369 |
| 4,982,096 A | * | 1/1991 | Fujii et al. ................... 250/367 |
| 5,117,114 A | | 5/1992 | Street et al. ............ 250/370.11 |
| 5,150,394 A | | 9/1992 | Karellas ....................... 378/62 |
| 5,168,540 A | * | 12/1992 | Winn et al. .................. 385/128 |
| 5,187,369 A | | 2/1993 | Kingsley et al. ........ 250/370.11 |
| 5,220,170 A | | 6/1993 | Cox et al. .............. 250/370.09 |
| 5,276,328 A | * | 1/1994 | Yoshida et al. ............. 250/368 |

(List continued on next page.)

FOREIGN PATENT DOCUMENTS

| | | | |
|---|---|---|---|
| EP | 291299 A1 | 11/1988 | |
| JP | 04-002989 | * 1/1992 | ............ 250/370.09 |
| JP | 04002989 A | * 1/1992 | ............ 250/370.09 |

OTHER PUBLICATIONS

Ryzhikov et al., Studies of effects of isovalent dopants on spectral–kinetic and scintillation characteristics of zinc selenide, Nov. 9–15, 1997, Nuclar Science Symposium, 1997, IEEE, vol. 1, pp. 848–849.*

Ryzhikov et al. Studies of effects of isovalent dopants on spectral–kinetic and scintillation characteristics of zinc selenide, Nov. 9–15, 1997, Nuclear Science Symposium, 1997. IEEE, vol. 1, pp. 848–849.*

(List continued on next page.)

Primary Examiner—Drew A. Dunn
Assistant Examiner—Glen Kao
(74) Attorney, Agent, or Firm—Fay, Sharpe, Fagan, Minnich & McKee, LLP

(57) ABSTRACT

X-rays from an x-ray tube (16) pass through an examination region (14) and are detected by a single or two-dimensional x-ray detector (20). The x-ray detector (20) includes an array (22) of photodiodes, CCD devices, or other opto-electrical transducer elements. A matching array (24) of transparent scintillator crystals, e.g., $CdWO_4$, is supported on and optically coupled to the photoelectric transducer array. A layer (26) of a high efficiency scintillator with a good spectral match with the opto-electrical transducer array but with limited light transmissiveness is optically coupled to the transparent scintillator array. The layer (26) is preferably zinc selenide ZnSe (Te). Electrical signals from the transducer array are reconstructed (32) into an image representation and converted into a human-readable display (38). To reduce cross-talk, the zinc selenide layer is etched with pits (40), sliced into strips (26'), cut into rectangles (26"), or has channels (44) cut into it. Scatter grids (46) are advantageously received in the channels. Alternately, the zinc selenide can be powdered, encased in a transparent binder, and applied as a coating layer (26''') to the individual transparent scintillator elements.

14 Claims, 7 Drawing Sheets

U.S. PATENT DOCUMENTS

| | | | | |
|---|---|---|---|---|
| 5,377,250 A | | 12/1994 | Hu | 378/15 |
| 5,378,894 A | * | 1/1995 | Akai | 250/368 |
| 5,493,121 A | * | 2/1996 | Fitzpatrick | 250/369 |
| 5,592,523 A | * | 1/1997 | Tuy et al. | 378/19 |
| 5,675,151 A | * | 10/1997 | Oka et al. | 250/368 |
| 5,698,857 A | * | 12/1997 | Lambert et al. | 250/483.1 |
| 5,786,599 A | * | 7/1998 | Rogers et al. | 250/483.1 |
| 5,818,897 A | * | 10/1998 | Gordon | 378/19 |
| 5,831,269 A | | 11/1998 | Nakamura et al. | 250/367 |
| 5,886,353 A | * | 3/1999 | Spivey et al. | 250/370.09 |
| 6,017,981 A | * | 1/2000 | Hugo | 523/216 |
| 6,060,713 A | * | 5/2000 | Skillicorn et al. | 250/367 |
| 6,087,665 A | * | 7/2000 | Hoffman et al. | 250/483.1 |
| 6,091,795 A | * | 7/2000 | Schafer et al. | 378/19 |
| 6,093,347 A | * | 7/2000 | Lynch et al. | 252/301.4 R |
| 6,141,104 A | * | 10/2000 | Schulz et al. | 356/375 |

OTHER PUBLICATIONS

"ArchitectureS for Focal Plane Image Processing" Fossum, Eric Optical Engineering 28(8), 865–871 (Aug. 1989).

"Charge–Domain Analog Signal Processing for Detector Arrays", Fossum, Eric Nuclear Instruments and Methods in Physics Research A275 (1989) 530–535.

"Reduced Dose and Improved Image Quality With a Computerized Line–Scan Radiography System", Sashin, et al. IEEE Transactions on Medical Imaging 12(2) (Jun. 1993) 380–383.

"Afterglow of Scintillative Materials For X–ray Computed Tomography", Ryzhikov, et al., Pribory i Tekhnika Eksperimenta, pp. 155–157 (1986).

"The Use of Semiconductor Scintillator Crystals A2B5 in Radiation Instruments", Rhzhikov, et al., Journal of Crystal Growth, pp. 655–658 (1999).

"Nonproportionality and Temporal Response of ZnSe:Te Scintillator", Balcerzyk, 5th International Conf. on Inorganic Scintillators & Applications, Aug. 16–20, 1999, Moscow, Russia, pp. 125–131.

\* cited by examiner

MULTI-LAYER X-RAY DETECTOR FOR DIAGNOSTIC IMAGING

BACKGROUND OF THE INVENTION

The present invention pertains to the diagnostic imaging and radiation-to-electrical signal conversion arts. It finds particular application in conjunction with a two-dimensional detector for computerized tomographic scanners and will be described with particular attention thereto. It is to be appreciated, however, that the invention will also find application in conjunction with conventional x-ray diagnostic systems, fluoroscopic x-ray systems, and other radiation detection systems for medical and non-medical examinations.

A third generation CT scanner includes an x-ray tube which projects a fan-shaped beam of radiation across an examination region. An array of x-ray detectors is disposed across the examination region from the x-ray tube to receive radiation which has passed through the subject. The x-ray source and detectors rotate concurrently around the examination region to collect x-ray attenuation data along a multiplicity of paths.

The x-ray detectors have included scintillation materials which convert received x-rays into light. The scintillation crystals are optically coupled to photomultiplier tubes, photodiodes, or CCD arrays. In single slice scanners, the x-ray beam was collimated into a thin fan beam and the detector included a linear array of detector elements. For faster data acquisition, detectors using two-dimensional arrays have also been utilized. A variety of scintillators have been utilized. Common scintillators include doped cesium iodide (CsI(Tl)), cadmium tungstate (CdWO$_4$), bismuth germanate (Bi$_4$Ge$_3$O$_2$, also known as BGO), and various ceramic scintillators such as Gd$_2$O$_2$S(Pr), (YGd) O (Eu$_2$) or$_3$Gd$_3$Ga$_5$O$_{12}$(Cr). Cesium iodide scintillators tend to have a relatively long after-glow which interferes with high-speed data collection. Bismuth germanate tends to have a relatively low light output with a less than optimal spectral match to most photodiodes. Cadmium tungstate has a higher output than bismuth germanate, but still higher outputs and better spectral matches to the photodiodes would be advantageous. Ceramic scintillators tend to absorb the emitted fluorescent light so that the optical quantum detection efficiency is low. Thicker layers give disappointingly low light output. Thinner layers do not absorb a very high proportion of the incident x-rays, so that they result in low x-ray quantum detection efficiency and expose the patient to high x-ray dosage.

The present invention contemplates a new and improved x-ray detector and a new and improved diagnostic apparatus and method incorporating an improved radiation detector.

SUMMARY OF THE INVENTION

In accordance with one aspect of the present invention, a radiation detector is provided for a medical diagnostic imaging system in which x-rays propagate along a path between a radiation source and the detector. The detector includes a multi-layer scintillator including upper scintillating layers of a relatively longer emission wavelength and permissibly low radiation absorption and lower scintillating layers of high x-ray absorption and permissibly shorter emission wavelength which are substantially transparent to the light emitted by the upper scintillating layers. At least one of the upper scintillating layers is doped zinc selenide. The upper and lower layers are aligned and arranged serially along the radiation path and present substantially equal cross sections. A light sensitive array is optically coupled with a lowest of the lower scintillating layers for viewing the multi-layer scintillator and combining optical outputs of its multiple layers into an analog output signal which adapted to be reconstructed into an image representation.

In accordance with another aspect of the present invention, a radiographic examination system is provided. An x-ray source projects x-rays through an examination region. An x-ray detector is disposed across the examination region from the x-ray source. The x-ray detector includes a doped zinc selenide scintillation layer, an opto-electrical transducer for converting light from the zinc selenide layer into electrical signals, and a light transmissive scintillation layer disposed between the array of opto-electrical elements and the zinc selenide layer.

In accordance with another aspect of the present invention, a radiographic examination system is provided. An x-ray source projects x-rays across an examination region. An x-ray detector is disposed across the x-ray examination region from the x-ray source. The detector includes an array of opto-electrical elements, an array of light transmissive scintillators, and a layer of higher efficiency scintillator material. The array of light transmissive scintillators is disposed on and optically coupled to the array of opto-electrical elements such that each of the opto-electrical elements converts light received from a corresponding transmissive scintillator into an electrical output signal. The layer of higher efficiency scintillator material is optically coupled to the transmissive scintillator array. The higher efficiency scintillator layer is a scintillator material of permissibly limited opacity, higher x-ray conversion efficiency than the transmissive scintillators, and preferably has a better optical match to a peak sensitivity spectrum of the opto-electrical transducers than the transmissive scintillators.

In accordance with another aspect of the present invention, a method of radiographic diagnostic examination is provided. X-rays are propagated through a subject and a first portion of them is converted into first light signals by a zinc selenide scintillator. Concurrently, a second portion of the x-rays which have propagated through the subject and the zinc selenide scintillator are converted into second light signals. The first and second light signals are combined and converted into electrical signals which are reconstructed into an image representation. At least a portion of the image representation is converted into a human-readable display.

One advantage of the present invention resides in its high x-ray conversion efficiency.

Another advantage of the present invention is that it promotes more rapid data acquisition and faster scanning times.

Another advantage of the present invention resides in the improved spectral match between the scintillator and photodiodes.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not be construed as limiting the invention.

DETAILED DESCRIPTION OF THE PREFERRED EMBODIMENTS

Figure 1:
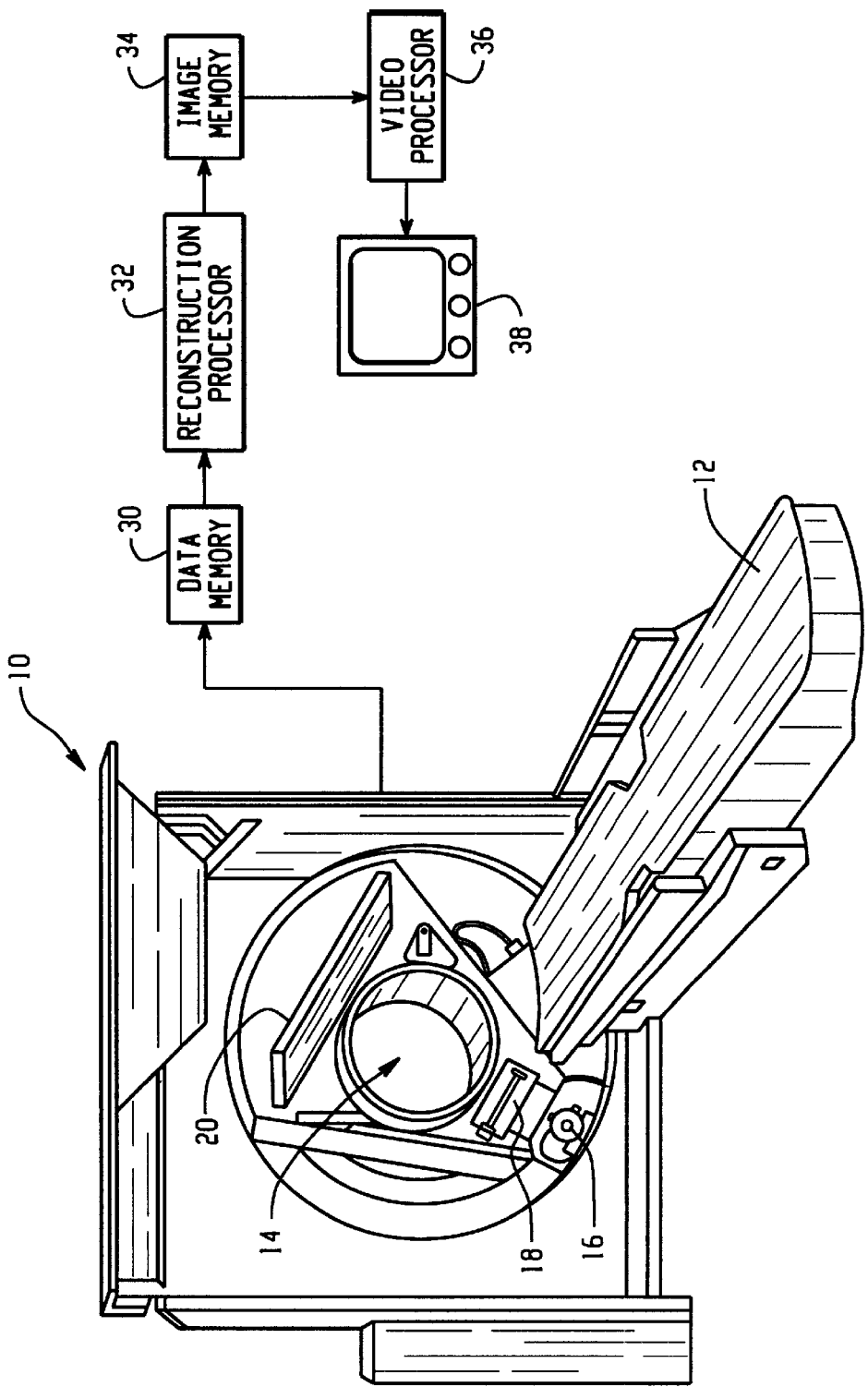
FIG. 1 is a diagrammatic illustration of a computerized tomographic diagnostic system in accordance with the present invention.

A computerized tomographic scanner 10 radiographically examines and generates diagnostic images of a subject disposed on a patient support 12. More specifically, the subject on the support 12 is moved into an examination region 14. An x-ray tube 16 mounted on a rotating gantry projects a beam of radiation through the examination region 14. A collimator 18 collimates the beam of radiation in one dimension to match the size and shape of a two-dimensional x-ray detector 20 disposed on the rotating gantry across the examination region from the x-ray tube.

Figure 2:
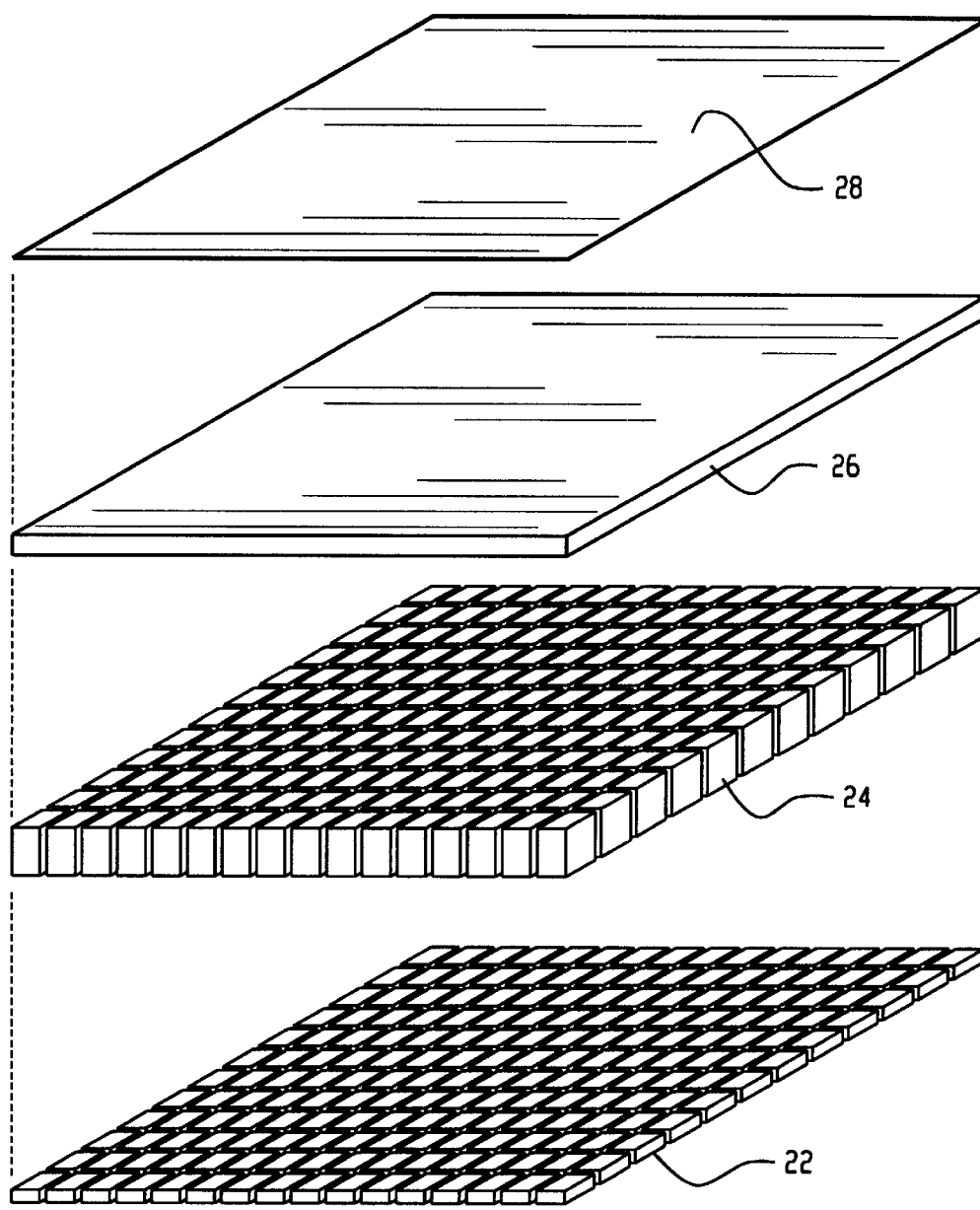
FIG. 2 is an expanded view of a preferred two-dimensional detector in accordance with the present invention.

With reference to FIG. 2, an array 22 of opto-electric transducers, preferably photodiodes, supports an array 24 of first optically transmissive scintillators or light pipe segments. More specifically, the segments of array 24 are preferably rectangular of substantially the same dimensions as the photodiodes of the array 22, preferably with dimensions of about 1–3 mm. The four sides each and every element of array 24 are painted or otherwise covered with a reflective coating while the top surface is left open to receive light and the bottom surface is left open to communicate light to the photodiode array.

A layer 26 of high conversion efficiency scintillator is optically coupled to the array 24. Optical coupling adhesives or greases, not shown, are preferably disposed between layer 26 and array 24 and between arrays 24 and 22. A reflective coating or layer 28 covers the scintillator layer 26 and its sides.

In the preferred embodiment, the layer 26 is doped zinc selenide ZnSe(Te), and the array 24 is cadmium tungstate. Cadmium tungstate is optically transparent and has a good radiation conversion efficiency. However, other light transmissive scintillators are also contemplated such as bismuth germanate, or the like. The height of the rectangular prisms of the transmissive array 24 is selected in accordance with the energy of the x-rays. Thicker prisms presenting a greater stopping power for higher energy x-rays may also be used.

The preferred zinc selenide sheet 26 has a thickness of 0.5–1.2 mm, with about 1 mm being preferred. The zinc selenide is substantially more efficient than cadmium tungstate (in appropriate circumstances it may twice as efficient) and even more efficient than bismuth germanate at converting x-rays into light. However, zinc selenide absorbs some of the fluorescent light limiting the path length that light can travel through it. Due to the limited light transmission distances and the high indices of refraction, a continuous sheet of zinc selenide is advantageously placed over the array 24 without significant cross-talk to neighboring elements.

Figure 3:
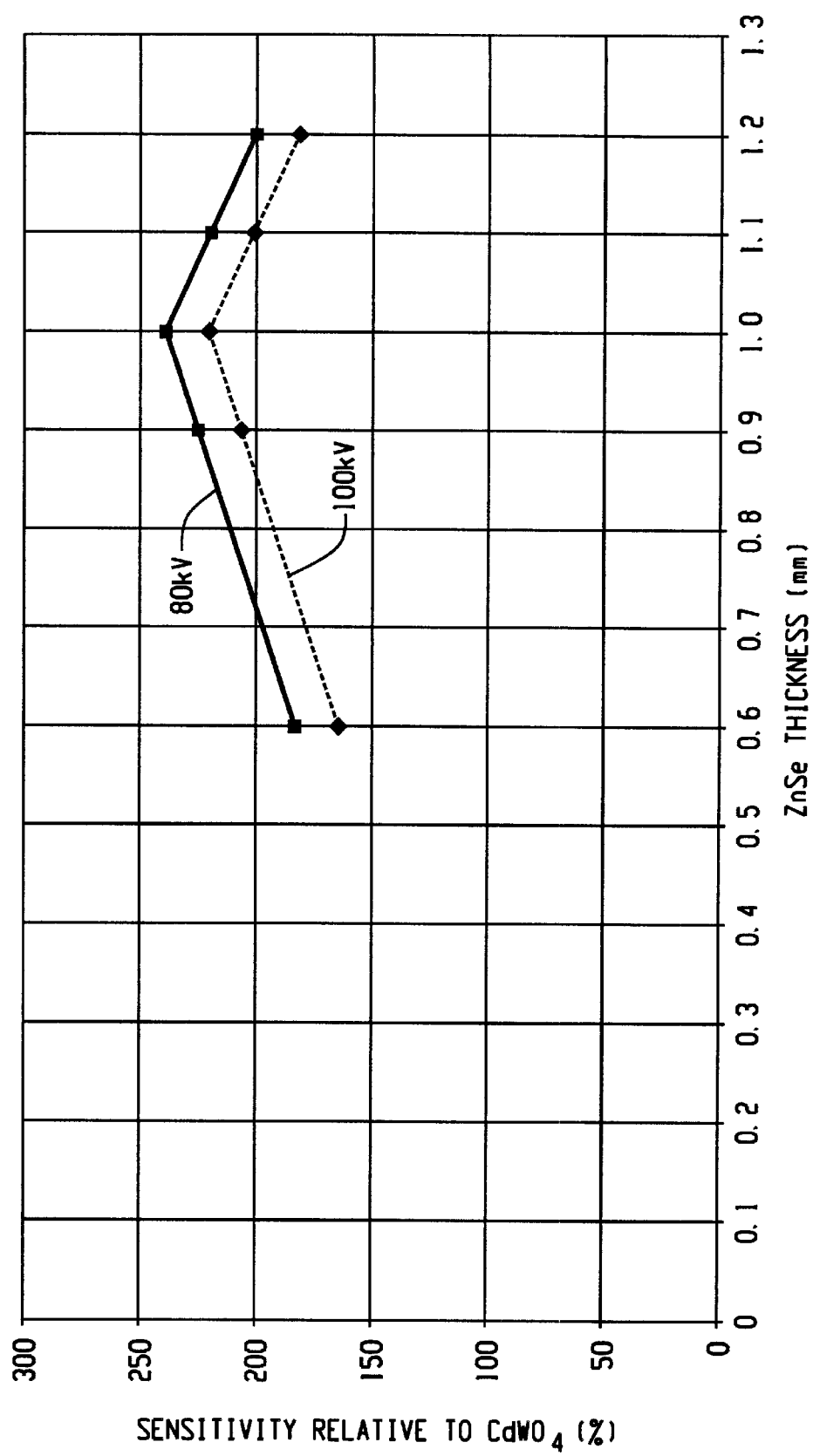
FIG. 3 is a plot of x-ray sensitivity with layers of zinc selenide on cadmium tungstate relative to cadmium tungstate taken alone.

With reference to FIG. 3, the improvement in x-ray conversion relative to an array of cadmium tungstate without an overlayer 26 varies with the thickness of the zinc selenide overlayer. As seen from FIG. 3, the conversion efficiency is about 120% better at around 1 mm thickness for 100 kV x-rays and about 140% better for 80 kV x-rays without phantom. Although zinc selenide scintillator is preferred, other scintillators such as gadolinium oxy-sulfide are also an improvement over prior crystal combinations. In the gadolinium oxy-sulfide $Gd_2O_2S(Pr)$ embodiment, the layer 26 is preferably 0.3–2.2 mm, more preferably 0.5 mm.

With reference again to FIG. 1, the output from the opto-electrical conversion array 22 along with information on the angular position of the rotating gantry are communicated to a data memory 30. The data from the data memory is reconstructed by a reconstruction processor 32. Various known reconstruction techniques are contemplated including convolution and backprojection techniques, cone beam reconstruction techniques, ML–EM techniques, algebraic reconstruction techniques, and the like. Spiral and multi-slice scanning techniques are also contemplated, provided that the data memory 30 also receives electronic input indicating longitudinal position or motion of the subject on the patient support 12 relative to the gantry 10.

The volumetric image representation generated by the reconstruction processor is stored in a volumetric image memory 34. A video processor 36 withdraws selective portions of the image memory to create slice images, projection images, surface renderings, and the like and reformats them for display on a monitor 38, such as a video or LCD monitor.

Figure 4:
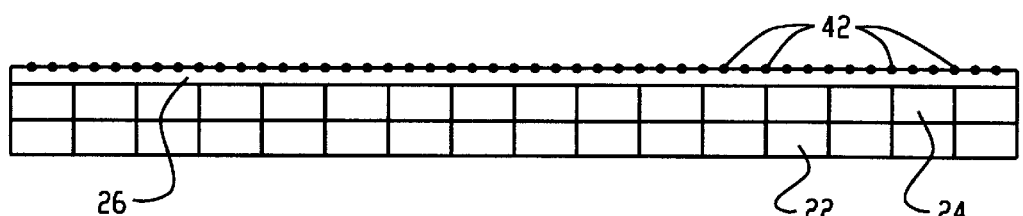
FIG. 4 is a side view of an alternate embodiment of the detector system of FIG. 2.

With reference to FIG. 4, in a first alternate embodiment, the cross-talk potential is reduced by laser etching or otherwise making pit marks or surface irregularities 42 along an upper surface of the layer 26. These marks tend to scatter light and inhibit total reflection of light from the top surface. Additional laser etched pit marks or analogous surface irregularities are made at various points along an upper surface of the layer 26 to further promote scatter of light generated in the layer 26 toward the array 24.

Figure 5:
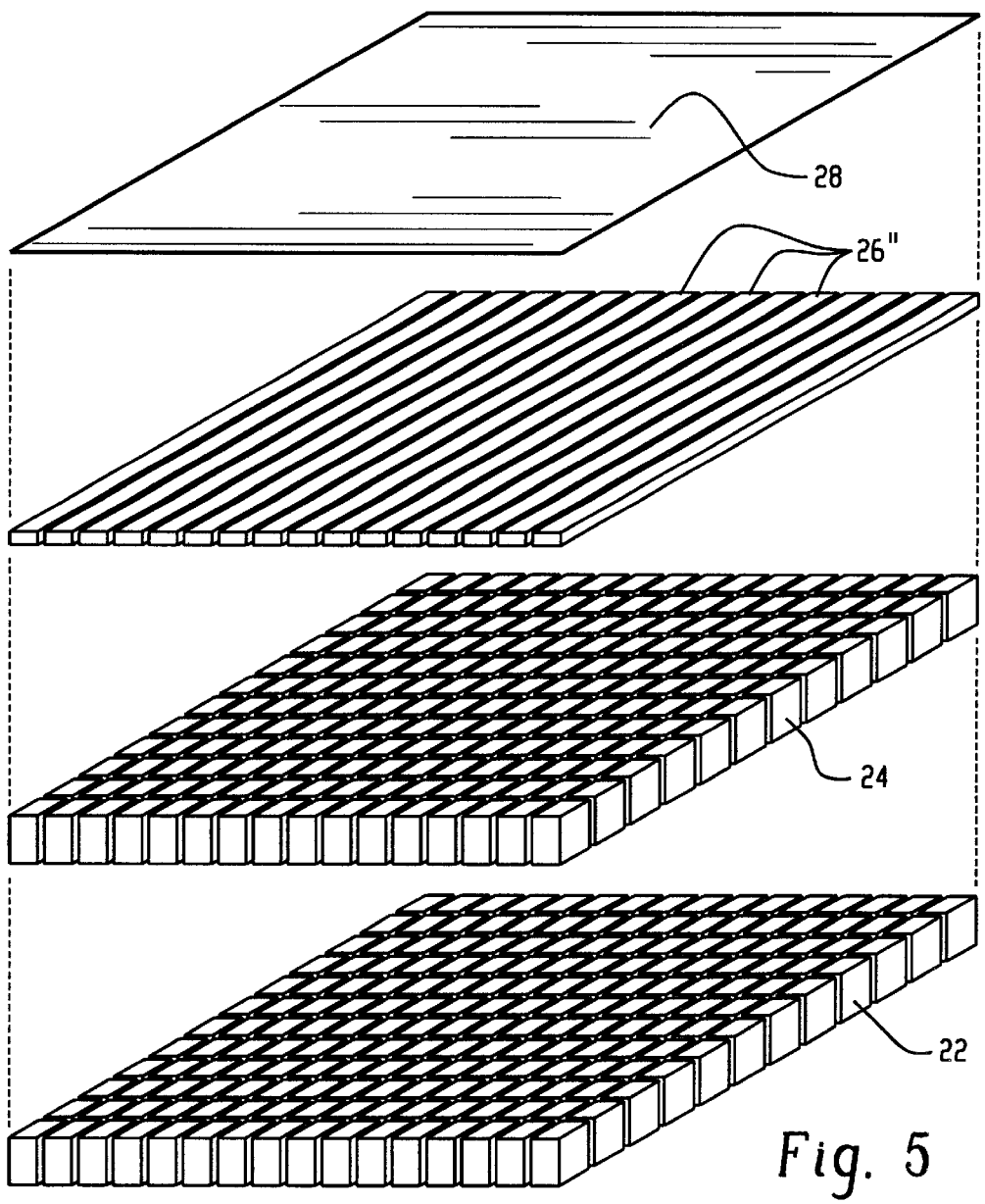
FIG. 5 is an expanded view of yet another alternate embodiment of the detector system of FIG. 2.

With reference to FIG. 5, cross-talk can be further inhibited by dividing the layer 26 into a plurality of strips 26'. In the illustrated embodiment, the strips have the same width as the individual crystals of the array 24. Of course, each strip can span two rows of crystals or other integral numbers. It is also advantageous to coat each side of each strip with an optical reflector.

Figure 6:
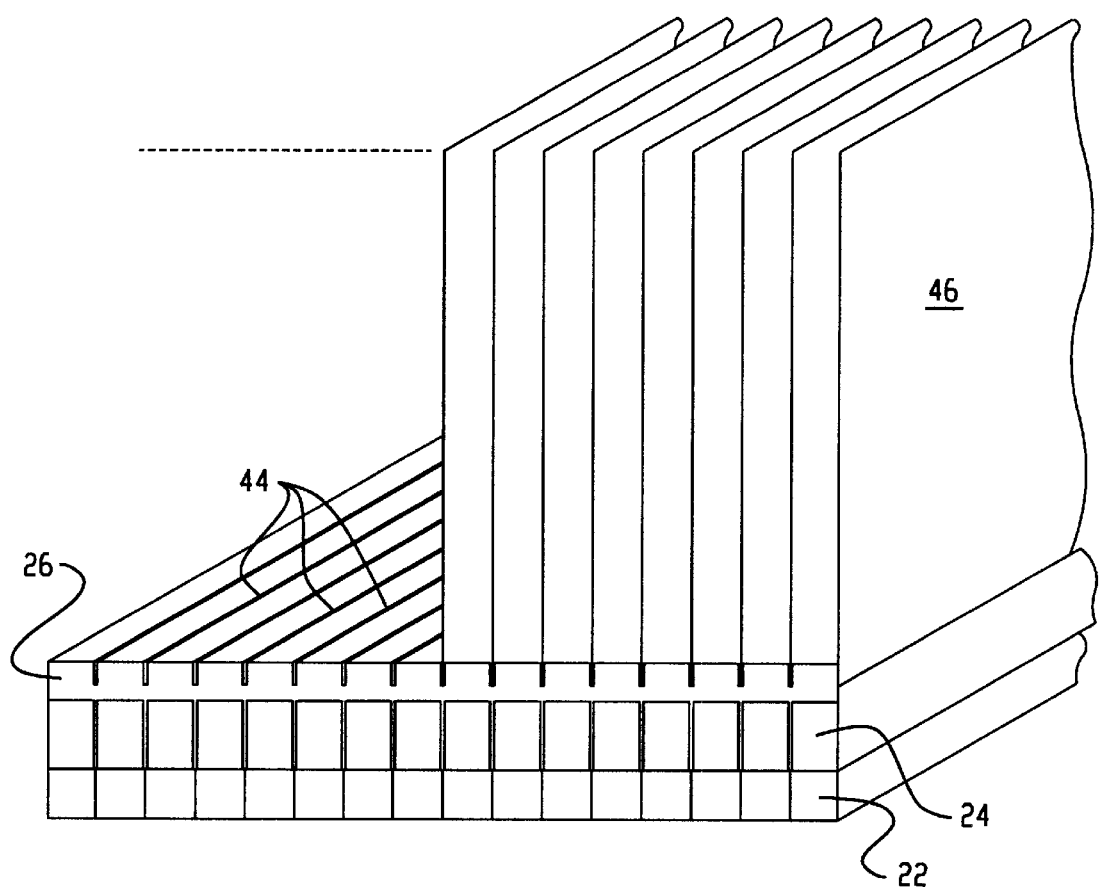
FIG. 6 is a sectional perspective view of an alternate embodiment of the detector system of FIG. 2 with scatter shields.

With reference to FIG. 6, in another alternate embodiment, the layer 26 has grooves 44. First, the grooves inhibit cross-talk. Second, the grooves provide mounting slots for anti-scatter grid elements 46. The anti-scatter grid elements are preferably thin sheets of molybdenum or other high density and high atomic number materials which block x-rays and other radiation which is traveling in other than a path directly from the x-ray tube to the detector. The anti-scatter grid may be white, to reflect the light back into the elements. In this manner, x-rays that are scattered from structures in or around the patient are blocked from reaching the detector.

Figure 6A:
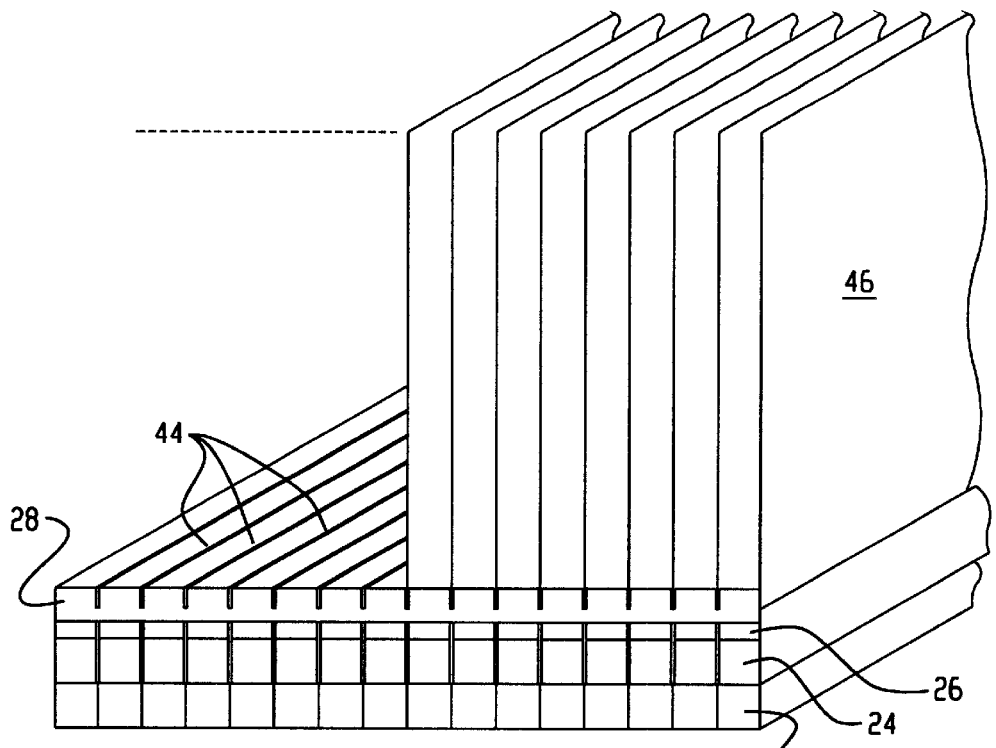
FIG. 6A is a sectional perspective view of another alternate embodiment with scatter shields.

With reference to FIG. 6A, the reflective layer 28 is thick enough to have the grooves 44, which provide mounting slots for the anti-scatter grid elements 46.

Figure 6B:
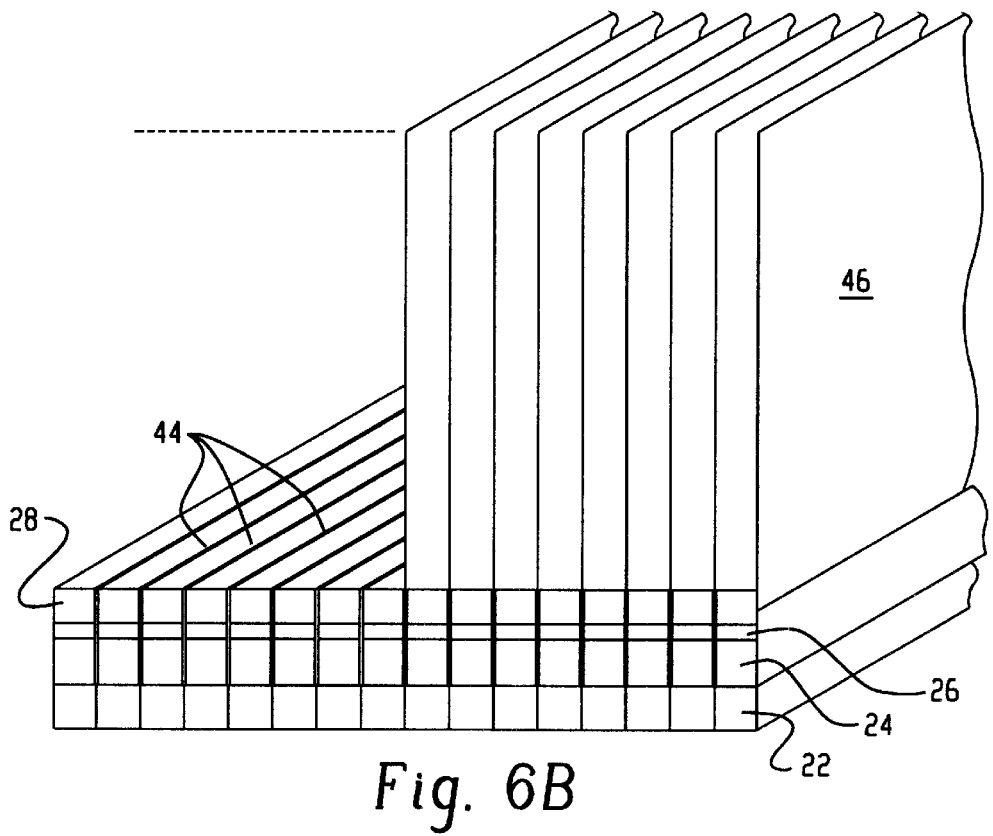
FIG. 6B is a sectional perspective view of yet another alternate embodiment with scatter shields.

With reference to FIG. 6B, the anti-scatter grid extends all the way down through the reflective coating layer 28 and layers 26 and 24.

Figure 7:
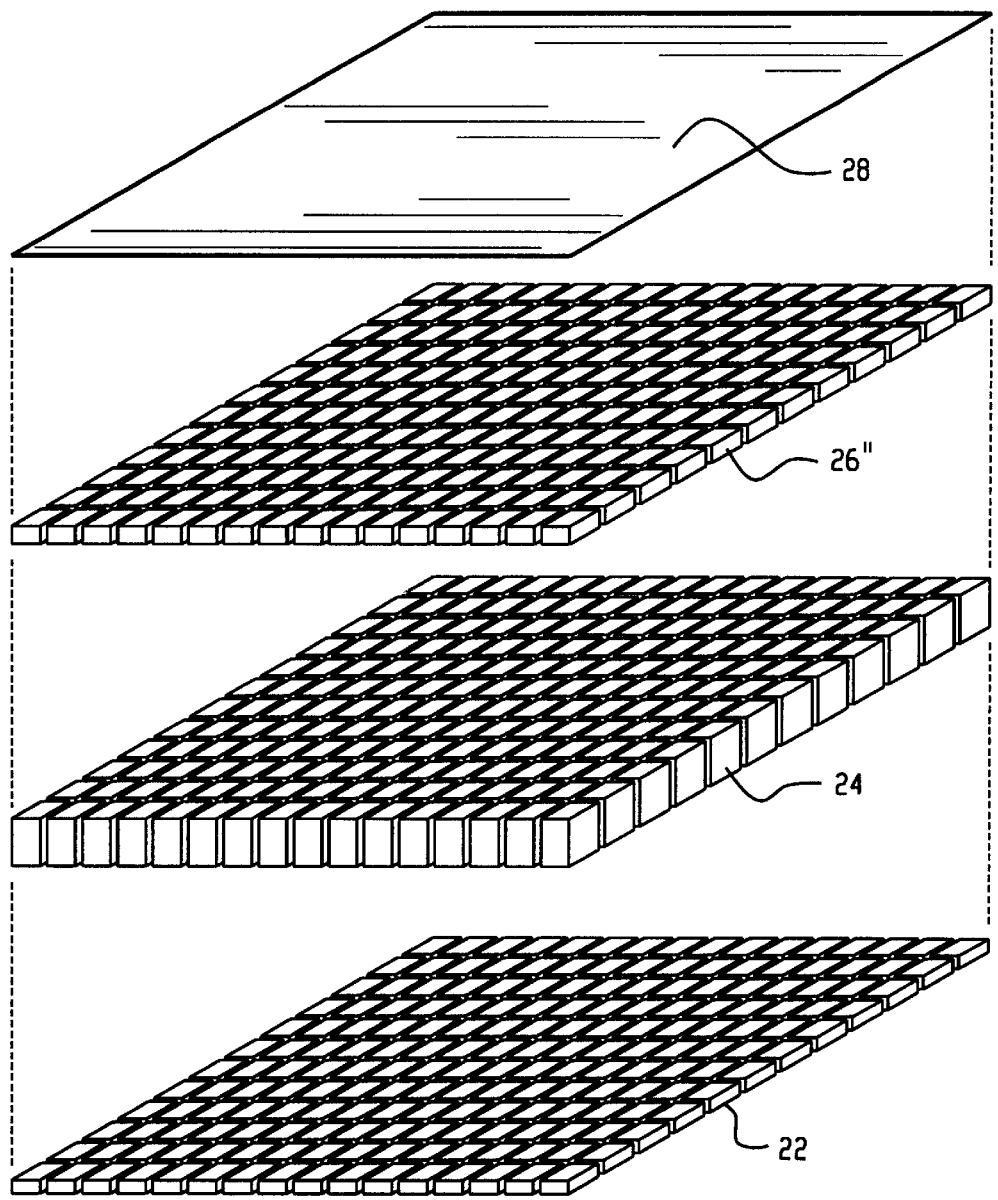
FIG. 7 is an expanded view of yet another alternate embodiment of the detector system of FIG. 2; and, FIG. 8 is a side sectional view of yet another alternate embodiment of the detector system of FIG. 2.

With reference to FIG. 7, cross-talk can be reduced still further by dividing the layer 26 into a multiplicity of individual elements 26" of the same cross-section as individual or small groups of the elements of array 24. Each element may advantageously be coated on all four sides with a white reflector.

Figure 8:
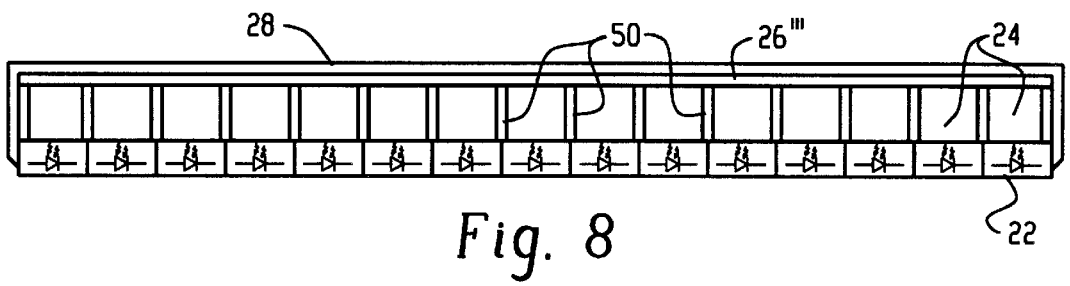

Crystalline zinc selenide is amenable to being formed or sliced into layers about 1 mm in thickness. However, other ways of applying the zinc selenide layers are also contemplated. With reference to FIG. 8, the zinc selenide material is pulverized, mixed with a transparent binder to form a paint 26"', and used to coat the top surface of each prism of the array 24. Again, the thickness of the coating 26"' is typically less than 1 mm. Reflective coatings 50 are applied to the side surfaces of each prism of array 24.

It is to be appreciated that the x-ray detectors described in this application are useable to detect x-rays in other applications. For example, when the x-ray source and detector do not move relative to each other, conventional shadowgraphic or projection x-rays are generated. In another embodiment, the x-ray source and detector are configured for relative motion along the longitudinal axis of the subject to generate larger shadowgraphic images. It will also be appreciated that subjects other than human patients can be examined. For example, manufactured items undergoing x-ray quality control can be moved through the scanner on a conveyor system. Analogously, luggage for aircrafts can be radiographically examined by being moved between the x-ray source and detectors described above on a conveyor system. Numerous other x-ray examination and evaluation techniques are also contemplated.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. In a medical diagnostic imaging system which generates images from x-rays propagating from a radiation source to a radiation detector, the radiation detector comprising:
    a multi-layer scintillator including upper scintillating layers of relatively longer emission wavelength and lower x-ray absorption, at least one of the upper layers being doped zinc selenide, and lower scintillating layers of higher x-ray absorption and shorter emission wavelength which are substantially transparent to the light emitted by the upper layers, the upper and lower layers being aligned and arranged serially along a path of x-ray propagation and presenting a substantially equal cross section to x-rays propagating along the path; and
    a light sensitive array optically coupled to a lowest of the lower scintillating layers for viewing the multi-layer scintillator and combining the optical outputs of its multi-layers into an analog output which is adapted for reconstruction into a diagnostic image.

2. The radiation detector as set forth in claim 1 wherein the zinc selenide is in powdered form and is incorporated into a sheet of transparent resin.

3. The radiation detector as set forth in claim 1 wherein one of the lower scintillating layers includes a layer of monocrystalline cadmium tungstate.

4. In a medical diagnostic imaging system which generates images from x-rays propagating from a radiation source to a radiation detector, the radiation detector comprising:
    a multi-layer scintillator including:
        an upper non-segmented scintillating layer of zinc selenide doped with tellurium, and
        a two-dimensional array of scintillators arranged to form a lower scintillating layer with higher z-ray absorption and shorter emission wavelength than tellurium doped zinc selenide and which is substantially transparent to the light emitted by the tellurium doped zinc selenide layer, the upper and sower layer being arranged serially along a path of x-ray propagation and presenting a substantially equal cross section to x-rays propagating along the path: and
    a two-dimensional array of opto-electric transducers, each transducer optically coupled to one of the scintillators of the lower scintillating layer, each of the opto-electric transducers combining the optical outputs from the upper scintillating layer and a corresponding one of the scintillators of the lower scintillating layer into an electrical output signal which is adapted for reconstruction into a diagnostic image.

5. The radiation detector as set forth in claim 4 wherein the upper scintillating layer: includes:
    powdered doped zinc selenide scintillator material dispersed in a transparent binder.

6. The radiation detector system as set forth in claim 4 wherein the upper scintillating layer includes a series of parallel channels.

7. The medical diagnostic imaging system as set forth in claimed further including x-ray scatter grids received and supported in the channels.

8. The radiation detector system as set forth in claim 4 wherein the upper scintillating layer includes particulate zinc selenide doped with tellurium scintillator dispersed in a light transmissive binder.

9. In a medical diagnostic by imaging system which generates images from x-rays propagating from a radiation source to a radiation detector, the radiation detector comprising:
    a multi-layer scintillator including an upper scintillating layer of monocrystalline doped zinc selenide, and at least one lower scintillating layer defined by a two-dimensional array of cadmium tungstate scintillator tiles each of which has higher x-ray absorption and shorter emission wavelength than the doped zinc selenide and each of which is substantially transparent to the light emitted by the upper layer, the upper and lower layers being arranged along a path of x-ray propagation and presenting a substantially equal cross section to x-rays propagating along the path; and,
    a two-dimensional array of photodiodes, each photodiode optically coupled to a corresponding one of the scintillator tiles of the lower layer for converting an optical output of the corresponding scintillator tile and an optical contribution from the upper layer into an electrical output signal which is adapted for reconstruction into a diagnostic image.

10. In a diagnostic imaging system which generates images from x-rays propagating from a radiation source to a radiation detector, the radiation detector comprising:

a multi-layer scintillator including upper scintillating layers of relatively longer emission wavelength and lower x-ray absorption, at least one of the upper layers being doped zinc selenide, and lower scintillating layers of higher x-ray absorption and shorter emission wavelength which are substantially transparent to the light emitted by the upper layers; and an array of silicon photodetectors with a spectral response peak in a range of 600–1000 nanometers optically coupled to a lowest of the lower scintillating layers for viewing the multi-layer scintillator and combining optical outputs of its multi-layers into an electrical output which is adapted for reconstruction into a diagnostic image.

11. A radiographic examination system comprising:

an x-ray source for projecting x-rays through an examination region;

an x-ray detector disposed across the examination region from the x-ray source, the x-ray detector including:
  a unitary doped zinc selenide scintillation layer which is etched in a two-dimensional first grid pattern to promote internal scattering of light within the zinc selenide layer, the zinc selenide scintillation layer converting x-rays into light,
  a two-dimensional array of light transmissive scintillators arranged in a second grid pattern and disposed below the zinc selenide scintillation layer to conduct the light from the zinc selenide scintillation layer and to convert x-rays that passed through the zinc selenide scintillator into light, and
  a two-dimensional array of opto-electrical transducers arranged in a third grid pattern, the first, second, and third grid patterns directly overlaying each other, such that the opto-electrical transducers convert light from the zinc selenide scintillator layer and the light transmissive scintillator array into electrical signals.

12. A radiographic examination system comprising:

an x-ray source for projecting x-rays across an examination region;

an x-ray detector disposed across the x-ray examination region from the x-ray source, the x-ray detector including:
  an array of opto-electrical elements,
  an array of light transmissive scintillators disposed on and optically coupled to the array of opto-electrical elements such that each of the opto-electrical elements converts light received from a corresponding transmissive scintillator into an electrical output signal, and
  a layer of higher efficiency scintillator material optically coupled to the transmissive scintillator array, a grid of pits being defined in a surface of the higher efficiency scintillator layer opposite the transmissive scintillator array to induce scatter, the higher efficiency scintillator layer being a scintillator material of limited opacity, higher x-ray conversion efficiency than the transmissive scintillators, and having a better optical match to a peak sensitivity spectrum of the opto-electrical transducers than the transmissive scintillators.

13. The radiographic examination system as set forth in claim 12 wherein the higher efficiency scintillator layer is a ceramic scintillator layer.

14. A radiographic examination system comprising:

an x-ray source for projecting x-rays across an examination region;

an x-ray detector disposed across the x-ray examination region from the x-ray source, the x-ray detector including:
  an array of opto-electrical elements,
  an array of light transmissive scintillators disposed on and optically coupled to the array of opto-electrical elements such that each of the opto-electrical elements converts light received from a corresponding transmissive scintillator into an electrical output signal, and
  a high efficiency scintillator layer divided into one of strips and rectangles which are dimensionally mismatched to the array of light transmissive scintillators and are optically coupled to the light transmissive scintillator array, the higher efficiency scintillator layer being a scintillator material of limited opacity, higher x-ray conversion efficiency than the transmissive scintillators, and having a better optical match to a peak sensitivity spectrum of the opto-electrical transducers than the transmissive scintillators.

* * * * *